United States Patent Office 3,361,394
Patented Jan. 2, 1968

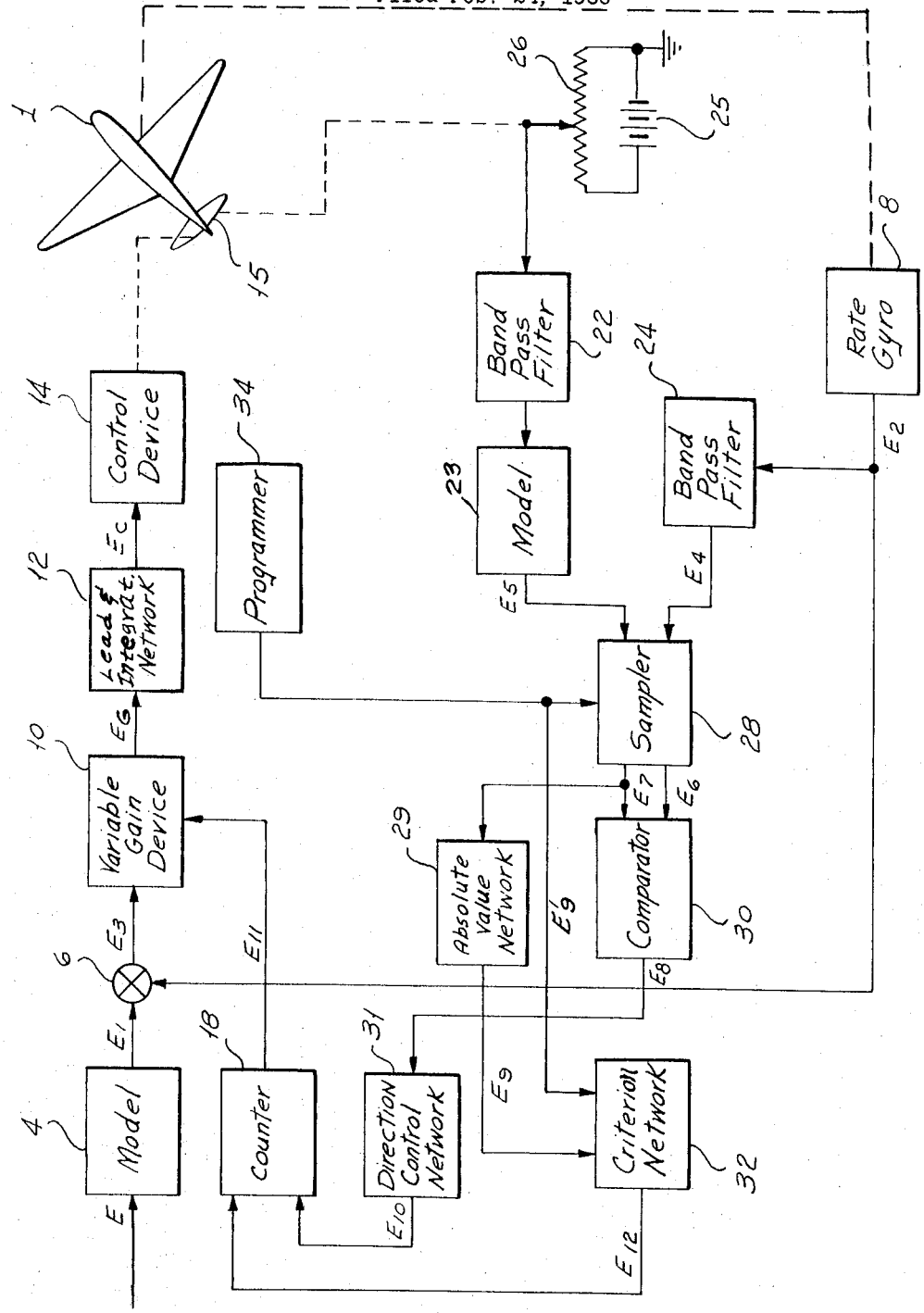

3,361,394
FLIGHT CONTROL SYSTEM
George H. Pfersch, Lodi, N.J., assignor to The Bendix Corporation, a corporation of Delaware
Filed Feb. 24, 1966, Ser. No. 529,803
6 Claims. (Cl. 244—77)

ABSTRACT OF THE DISCLOSURE

A system for controlling an aircraft in response to gain adjusted error signals. Signals corresponding to the actual response of the aircraft and signals corresponding to the expected response of the aircraft in accordance with the dynamic characteristics of the craft are provided. Error signal gain is adjusted in accordance with the difference between said actual and expected response signals.

---

The invention relates to flight control systems and, more particularly, to a system for controlling an aircraft in response to gain adjusted signals.

When controlling an aircraft in response to gain adjusted command signals, the gain adjustment of the command signals must be changed to compensate for changing flight conditions. Heretofore, this has been accomplished by changing gain adjustment as a function of the difference between the actual and desired responses of the aircraft wherein the actual response is in accordance with the gain adjusted command signals and the desired response is in accordance with the simulated response of an ideal aircraft to the command signals.

One object of this invention is to provide a flight control system including novel means to compensate for changing flight conditions.

Another object of the invention is to provide a flight control system which adjusts command signal gain in accordance with the dynamic characteristics of the particular aircraft.

Another object of this invention is to provide means for changing the gain adjustment of aircraft command signals as a function of the difference between the actual and expected responses of the aircraft wherein the expected response of the aircraft is in accordance with the displacement of an aircraft control surface in response to the gain adjusted command signals.

This invention contemplates a system for controlling an aircraft comprising means for providing an error signal; variable gain means for adjusting the gain of the error signal; means connected to the variable gain means for controlling the aircraft in response to the gain adjusted signal; and means connected to the variable gain means for changing the gain thereof in accordance with the difference between the actual and expected responses of the aircraft.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

In the drawing:

The single figure represents a block diagram of a flight control system constructed in accordance with the present invention.

A pitch command signal E corresponding to the displacement of an aircraft 1 relative to a pitch reference is applied to a model 4. Model 4 is a constant parameter network simulating the dynamic characteristics of an ideal aircraft and has a transfer function corresponding to desired aircraft response. Model 4 differentiates signal E in accordance with the simulated dynamic characteristics and provides a signal $E_1$ corresponding to desired pitch rate. A rate gyro 8 mounted on aircraft 1 provides a signal $E_2$ corresponding to actual pitch rate of aircraft 1. Signals $E_1$ and $E_2$ are combined at a summation point 6 providing an error signal $E_3$.

Error signal $E_3$ is applied to a variable gain device 10 providing a gain adjusted signal $E_G$. Signal $E_G$ is applied to a lead and integrating network 12 which corrects for long term errors in pitch displacement and provides a control signal $E_c$. Control signal $E_c$ is applied to an aircraft control device 14 for operating a control surface, such as the elevators 15, to control the pitch attitude of aircraft 1.

Actual pitch rate signal $E_2$ from rate gyro 8 is applied to a band pass filter 24 which differentiates the signal and provides a signal $E_4$ corresponding to actual pitch acceleration of aircraft 1. A potentiometer 26 is connected across a direct current source 25 and is connected by suitable mechanical means to control surface 15 of aircraft 1 for providing an output corresponding to the displacement of control surface 15 from a reference position. The output of potentiometer 26 is applied to a band pass filter 22 which differentiates the output and provides a signal corresponding to control surface rate. The signal from band pass filter 22 is applied to a model 23. Model 23 is a constant parameter network simulating the dynamic characteristics of aircraft 1 and has a transfer function corresponding to expected response of aircraft 1. Model 23 differentiates the signal from band pass filter 22 in accordance with the dynamic characteristics of aircraft 1 and provides a signal $E_5$ corresponding to expected pitch acceleration of aircraft 1.

Actual pitch acceleration signal $E_4$ from band pass filter 24 and expected pitch acceleration signal $E_5$ from model 26 are applied to a sampler 28 which provides pulses $E_6$ and $E_7$ corresponding to actual and expected pitch acceleration signals $E_4$ and $E_5$, respectively, at predetermined intervals in accordance with a sampling program determined by a programmer 34. Actual and expected pitch acceleration pluses $E_6$ and $E_7$ from sampler 28 are applied to a comparator 30 which provides a pulse $E_8$ corresponding to the difference between pulses $E_6$ and $E_7$. Pulse $E_7$ is applied to an absolute value network 29 which provides a pulse $E_9$ corresponding to the absolute value of pulse $E_7$.

Pulse $E_9$ from absolute value network 29 is applied to a criterion network 32. Criterion network 32 is operated by programmer 34 to store a preceding pulse $E_9'$ and to compare the stored pulse to a present pulse $E_9$. Criterion network 32 provides a compute pulse $E_{12}$ when the difference between preceding stored pulse $E_9'$ and present pulse $E_9$ exceeds a predetermined minimum.

Pulse $E_8$ from comparator 30 is applied to a direction control network 31 which determines the sense of pulse $E_8$ and provides a positive or negative direction control pulse $E_{10}$ for controlling a counter 18. Counter 18 is a bi-directional device for count-up and count-down operation such as the counter disclosed in .S. Patent No. 3,221,238, issued November 30, 1965, to Arnold Unger et al. and assigned to The Bendix Corporation, assignee of the present invention. Counter 18 is rendered effective by compute pulse $E_{12}$ from criterion network 32 and is adjusted to its next higher or lower state in response to direction control pulse $E_{10}$ from direction control device 31 to provide a signal $E_{11}$ for incrementally increasing or decreasing the gain of variable gain device 10.

Operation

Signal $E_1$ corresponding to desired pitch rate is combined with signal $E_2$ corresponding to actual pitch rate providing error signal $E_3$. The gain of error signal $E_3$ is adjusted by variable gain device 10 which provides a gain adjusted signal $E_G$. Signal $E_G$ is applied to lead and integrating network 12 which provides control signal $E_c$ for controlling aircraft 1.

A comparator 30 provides a pulse $E_8$ corresponding to the difference between the actual and expected responses of aircraft 1 at predetermined intervals. Pulse $E_8$ is applied to direction control network 31 which provides a direction control pulse $E_{10}$. Criterion network 32 compares a present absolute pitch acceleration pulse $E_9$ to a preceding stored pulse $E_9'$, and provides a pulse $E_{12}$ when the difference between the compared pulses exceeds a predetermined minimum. Pulse $E_{10}$ from direction control network 31 and pulse $E_{12}$ from criterion network 32 are applied to counter 18 which is rendered effective by pulse $E_{12}$ and is adjusted to its next higher or lower count-up or count-down state in response to pulse $E_{10}$ for providing pulse $E_{11}$ to control the gain of variable gain device 10.

The novel flight control system embodied in the present invention is self-adaptive in that it senses its actual performance relative to an expected performance and corrected for differences therebetween. Since pulse $E_{11}$ depends on the expected response of aircraft 1 rather than the desired response to incrementally change the gain of variable gain device 10, the stability of the control system is enhanced.

Although but a single embodiment of the invention has been illustrated and described in detail, it is to be expressly understood that the invention is not limited thereto. For example, although the invention has been described relative to pitch control, it is adaptable to other attitude parameters as well. Various changes may also be made in the design and arrangement of the parts without departing from the spirit and scope of the invention as the same will now be understood by those skilled in the art.

What is claimed is:

1. A system for controlling an aircraft, comprising:
    means for providing an error signal;
    variable gain means connected to the error signal means for providing a gain adjusted signal;
    means connected to the variable gain means for controlling the aircraft in response to the gain adjusted signal;
    means for providing a signal corresponding to the expected response of the aircraft in accordance with the dynamic characteristics of the aircraft;
    means for providing a signal corresponding to the actual response of the aircraft; and
    means connected to the expected response signal means and to the actual response signal means for changing the gain of the variable gain means in accordance with the difference between the expected and actual response signals.

2. A device as defined by claim 1 wherein the means for providing a signal corresponding to the expected response of the aircraft comprises:
    means connected to an aircraft control surface for providing a signal corresponding to the displacement thereof;
    means connected to the displacement signal means for providing a control surface rate signal; and
    means simulating the dynamic characteristics of the aircraft connected to the last mentioned means for differentiating the control surface rate signal and for providing the signal corresponding to the expected response of the aircraft.

3. A device as defined by claim 2 wherein the means connected to the expected response signal means and to the actual response signal means for changing the gain of the variable gain means in accordance with the difference between the expected and actual response signals comprises:
    a sampler connected to the actual response signal means and to the expected response signal means for sampling the actual and expected response signals and for providing pulses corresponding thereto;
    a comparator connected to the sampler for providing a pulse corresponding to the difference between the pulse provided by the sampler;
    means connected to the comparator for determining the sense of the difference pulse and for providing a direction control pulse in accordance with the difference pulse sense; and
    a counter connected to the last mentioned means for providing a pulse for changing the gain of the variable gain device in response to the direction control pulse.

4. A device as defined by claim 3 including:
    means connected to the sampler for providing an absolute expected response pulse;
    means connected to the absolute expected response pulse means for providing a compute pulse when the absolute expected response pulse is in accordance with predetermined criteria; and
    the counter being connected to the last mentioned means and rendered effective by the compute pulse for providing the pulse to change the gain of the variable gain device.

5. A device as defined by claim 4 wherein the means connected to the absolute expected response pulse means for providing a compute pulse when the absolute expected response pulse is in accordance with predetermined criteria, comprises:
    means for storing a preceding absolute expected response pulse and for comparing the stored pulse to a present absolute expected response pulse, and for providing the compute pulse when the difference between the compared pulses exceeds a predetermined minimum.

6. A device as defined by claim 3 wherein the counter is a bi-directional device having a plurality of count-up and count-down states, and is adjusted to its next succeeding state in response to the direction control pulse to provide a pulse for incrementally changing the gain of the variable gain device.

References Cited

UNITED STATES PATENTS

| | | | |
|---|---|---|---|
| 3,073,554 | 1/1963 | Kaufman | 244—77 |
| 3,113,749 | 12/1963 | Lee | 244—77 |

FERGUS S. MIDDLETON, *Primary Examiner.*